US010750901B2

United States Patent
Hansen et al.

(10) Patent No.: US 10,750,901 B2
(45) Date of Patent: Aug. 25, 2020

(54) METHOD OF DISPENSING A BEVERAGE, A BEVERAGE PREPARATION MACHINE, AND A SYSTEM

(71) Applicant: Koninklijke Douwe Egberts B.V., Utrecht (NL)

(72) Inventors: Nick Andrew Hansen, Banbury (GB); Simon Carr, Banbury (GB); Geoff York, Banbury (GB); Andrew Halliday, Banbury (GB); Egidijus Bartkus, Whippany, NJ (US)

(73) Assignee: Koninklijke Douwe Egberts B.V., Utrecht (NL)

( * ) Notice: Subject to any disclaimer, the term of this patent is extended or adjusted under 35 U.S.C. 154(b) by 132 days.

(21) Appl. No.: 14/648,228

(22) PCT Filed: Dec. 6, 2013

(86) PCT No.: PCT/IB2013/002904
§ 371 (c)(1),
(2) Date: May 28, 2015

(87) PCT Pub. No.: WO2014/096949
PCT Pub. Date: Jun. 26, 2014

(65) Prior Publication Data
US 2015/0297023 A1 Oct. 22, 2015

(30) Foreign Application Priority Data
Dec. 19, 2012 (GB) .................................. 1222937.3

(51) Int. Cl.
*A47J 31/56* (2006.01)
*A23F 5/12* (2006.01)
(Continued)

(52) U.S. Cl.
CPC ............... *A47J 31/56* (2013.01); *A23F 5/125* (2013.01); *A47J 31/40* (2013.01); *A47J 31/4492* (2013.01)

(58) Field of Classification Search
CPC .. A23F 3/14; A23F 5/125; A23F 5/385; A23L 23/10; A47J 31/4492; A47J 31/56
See application file for complete search history.

(56) References Cited

U.S. PATENT DOCUMENTS 3,937,134 A 2/1976 Molenaar et al.
4,501,761 A * 2/1985 Mahlmann .............. A23F 5/046
426/467

(Continued)

FOREIGN PATENT DOCUMENTS

CA 808588 A 3/1969
CN 101636099 1/2010
(Continued)

OTHER PUBLICATIONS

International Search Report, dated Mar. 20, 2014 for International Applicaition No. PCT/IB2013/002904 (3 pgs.).
(Continued)

*Primary Examiner* — Erik Kashnikow
*Assistant Examiner* — Preston Smith
(74) *Attorney, Agent, or Firm* — Fitch, Even, Tabin & Flannery LLP

(57) ABSTRACT

The present invention provides a method of dispensing a beverage comprising: a) inserting a beverage ingredient tablet (20) into a beverage preparation machine (30); b) measuring a surface finish of at least a portion of the beverage ingredient tablet (20) to identify the beverage ingredient tablet; c) configuring one or more dispense parameters of the beverage preparation machine (30) based on the identification of the beverage ingredient tablet (20);
(Continued)

and d) operating the beverage preparation machine (30) to dispense a beverage by contacting the beverage ingredient tablet (20) with an aqueous fluid.

8 Claims, 4 Drawing Sheets

(51) Int. Cl.
*A47J 31/44* (2006.01)
*A47J 31/40* (2006.01)

(56) References Cited

U.S. PATENT DOCUMENTS

| | | | | |
|---|---|---|---|---|
| 5,753,297 | A | * | 5/1998 | Schmed ............... A47J 31/0605 426/433 |
| 9,339,143 | B2 | | 5/2016 | Drost |
| 2002/0048621 | A1 | | 4/2002 | Boyd et al. |
| 2004/0089158 | A1 | | 5/2004 | Mahlich |
| 2004/0237793 | A1 | | 12/2004 | Zurcher et al. |
| 2005/0249052 | A1 | | 11/2005 | Benedetti et al. |
| 2008/0245236 | A1 | | 10/2008 | Ternite et al. |
| 2010/0132564 | A1 | | 6/2010 | Ozanne et al. |
| 2010/0260915 | A1 | * | 10/2010 | Young ..................... A23F 5/125 426/595 |
| 2012/0098526 | A1 | * | 4/2012 | Bucher ............... A47J 31/3623 324/204 |
| 2012/0251677 | A1 | * | 10/2012 | Yoakim ............. B65D 85/8043 426/112 |

FOREIGN PATENT DOCUMENTS

| | | |
|---|---|---|
| CN | 101877983 | 11/2010 |
| EP | 1440639 A1 | 7/2004 |
| EP | 2345352 A1 | 7/2011 |
| EP | 2227120 B1 | 9/2011 |
| EP | 2481330 A1 | 8/2012 |
| RU | 2306839 C2 | 9/2007 |
| WO | 9923888 A1 | 5/1999 |
| WO | 200228241 A1 | 4/2002 |
| WO | 2009081250 A2 | 7/2009 |
| WO | 2011089049 A1 | 7/2011 |
| WO | 2012004133 A1 | 1/2012 |
| WO | 2012066313 A2 | 5/2012 |
| WO | 2012123440 A1 | 9/2012 |
| WO | 2013046149 A1 | 4/2013 |

OTHER PUBLICATIONS

Combined Search and Examination Report for Application No. GB1222937.3 dated May 23, 2013 (6 pgs.).
Response to combined search and examination report dated Jun. 12, 2013 for Patent Application No. GB1222937.3 (1 pg.).
Notification of Grant for Application No. GB1222937.3 dated Oct. 21, 2014 (2 Pgs.).
Notification of the First Office Action, dated Dec. 30, 2016 for Chinese Patent Application No. 201380064896.3, with English translation (13 pgs.).
Japanese Patent Office, Office Action and English Translation thereof dated Apr. 25, 2016, from Japanese Patent Application No. 2015-544556, 5 pages.
Russian Patent Office, Office Action and English Translation thereof dated Jun. 21, 2016, from Russian Patent Application No. 2015114366.

* cited by examiner

METHOD OF DISPENSING A BEVERAGE, A BEVERAGE PREPARATION MACHINE, AND A SYSTEM

CROSS REFERENCE TO RELATED APPLICATIONS

This application is a U.S. national phase application of International Application No. PCT/IB2013/002904, filed Dec. 6, 2013, which claims benefit from Great Britain Application 1222937.3, filed Dec. 19, 2012, which are each hereby incorporated herein by reference in their entirety.

Field

The present disclosure relates to a method of dispensing a beverage, a beverage preparation machine and a system.

BACKGROUND

Machines for dispensing beverages are well known. For example, it is known to produce coffee-based beverages using drip-filter machines and espresso machines. Such machines may use roasted ground coffee which may be provided in loose form or in individual filter-wrapped doses in the form of pods or pouches.

Roasted ground coffee may also be formed into tablets, for example as described in CA808588. Typically, the coffee tablet is formed from pressed and compacted roasted ground coffee. The high compaction pressures used result in a coffee tablet that retains its shape during normal handling without the need for any overwrap or cover. Such coffee tablets may be used in espresso machines and filter machines.

In more recent times 'on-demand' beverage machines have been marketed which allow for beverages to be produced on an individual basis as required by a user from individual sealed capsules, cartridges or flexible bags of ground coffee. Still more recently, beverage machines allowing for convenient, on demand dispensation of a range of beverage types have been produced. One example of such a system is marketed under the brand name TASSIMO® by Kraft Foods, Inc. This system (as described in EP1440639) utilises a beverage preparation machine that comprises a barcode reader and a range of beverage cartridges wherein each beverage cartridge contains one or more beverage ingredients and is coded with a barcode. In use, the barcode reader of the beverage machine scans and reads the barcode on a beverage cartridge after it is inserted into the machine and uses information decoded from the barcode to set one or more dispensation parameters of the beverage machine for that dispensation cycle.

BRIEF SUMMARY OF THE DISCLOSURE

According to the present disclosure there is provided a method of dispensing a beverage comprising:
a) inserting a beverage ingredient tablet into a beverage preparation machine;
b) measuring a surface finish of at least a portion of the beverage ingredient tablet to identify the beverage ingredient tablet;
c) configuring one or more dispense parameters of the beverage preparation machine based on the identification of the beverage ingredient tablet; and
d) operating the beverage preparation machine to dispense a beverage by contacting the beverage ingredient tablet with an aqueous fluid.

Advantageously, the method allows the dispense parameters to be tailored to the requirements of each type of beverage ingredient tablet unlike prior art methods of using beverage ingredient tablets which cannot readily distinguish between different tablet types.

The one or more dispense parameters may be selected from the group comprising: temperature of the aqueous fluid; volume of the aqueous fluid dispensed; flow rate of the aqueous fluid; pressure of the aqueous fluid; and presence or absence of a pre-wet stage.

When measuring the surface finish of at least a portion of the beverage ingredient tablet, the surface measured may be a beverage ingredient surface, a surface of a label applied to the beverage ingredient tablet, or a surface of an insert inserted into the beverage ingredient tablet.

Using the beverage ingredient surface itself (in other words, the surface of the compressed powder itself rather than any separate element) for identification is preferred as it can avoid the need to provide a separate element bearing an identifier, such as a label or insert. This results in less environmental waste and a simplified manufacturing process. However, the present disclosure also includes the options of applying a label to at least a portion of the surface of the tablet or embedding an insert into the tablet which has at least a portion visible on the external surface of the tablet. The label or insert does not enclose the tablet or cover or extend over a majority of a surface of the tablet but only to the extent required for a sensor to sense the surface finish of the element.

Measuring the surface finish may comprise measuring one or more of: the colour of the surface, the reflectance of the surface, the roughness of the surface, and a pattern on the surface.

The measurement of the surface finish may be a non-contact measurement. While a contact sensor may be used, such as a profilometer, to measure the roughness of the surface finish, non-contact measurement is preferred. Advantageously, using a non-contact measurement is quicker than contact measurement and does not risk damaging or breaking the beverage ingredient tablet.

The non-contact measurement may comprise a surface metrology technique including but not limited to one or more of interferometry, confocal microscopy, focus variation, structured light scanning, and electrical capacitance. Alternatively, the non-contact measurement may include one or more of colorimetry, and photogrammetry.

The present disclosure also provides a beverage preparation machine comprising:
a chamber for receiving a beverage ingredient tablet;
a source of aqueous fluid;
a heater for varying the temperature of the aqueous fluid;
a sensor for measuring a surface finish of at least a portion of the beverage ingredient tablet in use;
a controller associated with the source of aqueous fluid, the heater and the sensor;
the controller being programmed to identify the beverage ingredient tablet based on the surface finish measurement and configure one or more dispense parameters of the beverage preparation machine based on said identification.

The one or more dispense parameters configured by the controller may be selected from the group comprising: temperature of the aqueous fluid; volume of the aqueous fluid dispensed; flow rate of the aqueous fluid; pressure of the aqueous fluid; and presence or absence of a pre-wet stage.

The sensor may be configured to measure one or more of: the colour of the surface, the reflectance of the surface, the roughness of the surface, and a pattern on the surface.

The sensor may be a contact sensor but is preferably a non-contact sensor.

The sensor may be an interferometer, a confocal microscope, a focus variation device, a structured light scanning device, a capacitive displacement sensor, a tristimulus colorimeter, a spectrophotometer, a spectrocolorimeter, a spectralradiometer or a photogrammeter.

The present disclosure also provides a system comprising a beverage preparation machine as described above and a beverage ingredient tablet.

The beverage ingredient tablet may comprise a compacted powder tablet containing one or more powdered beverage ingredients.

The beverage ingredient tablet may comprise a label applied to a surface of the beverage ingredient tablet, or an insert inserted into the beverage ingredient tablet.

The beverage ingredient tablet may comprise one or more ingredients in varying proportions. The ingredients may include, amongst others: roasted ground coffee, soluble coffee, soluble tea, milk powder, non-dairy whitener, sugar, artificial sweeteners. The beverage ingredient tablet may include one or more additives for colouring the tablet. The beverage ingredient tablet may in addition include binders or other excipients such as starches, maltodextrin and carboxymethylcellulose.

The beverage ingredient tablet may take any desired geometric form, for example, a cross-section which is circular, square, rectangular or oval. The tablet may have a substantially planar upper and/or lower surface. In one example, the tablet may be circular cylindrical in shape.

BRIEF DESCRIPTION OF THE DRAWINGS

Examples of the present disclosure will now be described, by way of example only, with reference to the accompanying drawings, in which.

DETAILED DESCRIPTION

In this specification unless otherwise required by the context, the following terms have the following meanings:

"Roasted coffee" means a coffee substance that has been produced by the roasting of green coffee beans. The substance may be in the form of a roasted coffee bean or in some other form produced by onward processing steps such as grinding, decaffeination, pressing, etc. Particular examples of roasted coffee include roasted coffee beans, roasted expeller cake, roasted and flaked coffee.

"Roasted ground coffee" means a roasted coffee substance that has been subject to a comminution process in order to reduce the particle size of the original roasted coffee substance. Again, unless otherwise required by the context the comminution process may include one or more of grinding, chopping, pounding and crushing.

"Beverage ingredient tablet" means a tablet of powdered/granular material which is self-load-bearing such that it may be, for example, unwrapped, handled and placed in a beverage preparation machine without substantially disintegrating. The self-load-bearing capacity may be derived from compression of the tablet ingredients. In addition, or alternatively, the tablet may comprise one or more binding components. The beverage ingredient tablet may contain one or a mixture of ingredients. The ingredients may include, for example, roasted ground coffee, instant coffee, tea, milk powder, or instant soup. The tablet may also include one or more additional components, for example, foamers, bulking agents, colouring agents, binders, sweeteners, etc.

Figure 1:
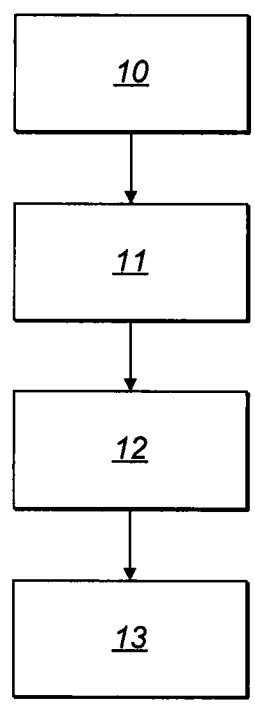
FIG. 1 is a flow chart of a method according to the present disclosure.

As shown in FIG. 1, the method of the present disclosure comprises a first step 10 of inserting a beverage ingredient tablet into a beverage preparation machine; a second step 11 of measuring a surface finish of at least a portion of the beverage ingredient tablet to identify the beverage ingredient tablet; a third step 12 of configuring one or more dispense parameters of the beverage preparation machine based on the identification of the beverage ingredient tablet; and a fourth step 13 of operating the beverage preparation machine to dispense a beverage by contacting the beverage ingredient tablet with an aqueous fluid, such as hot water to dissolve the tablet.

Figure 3:
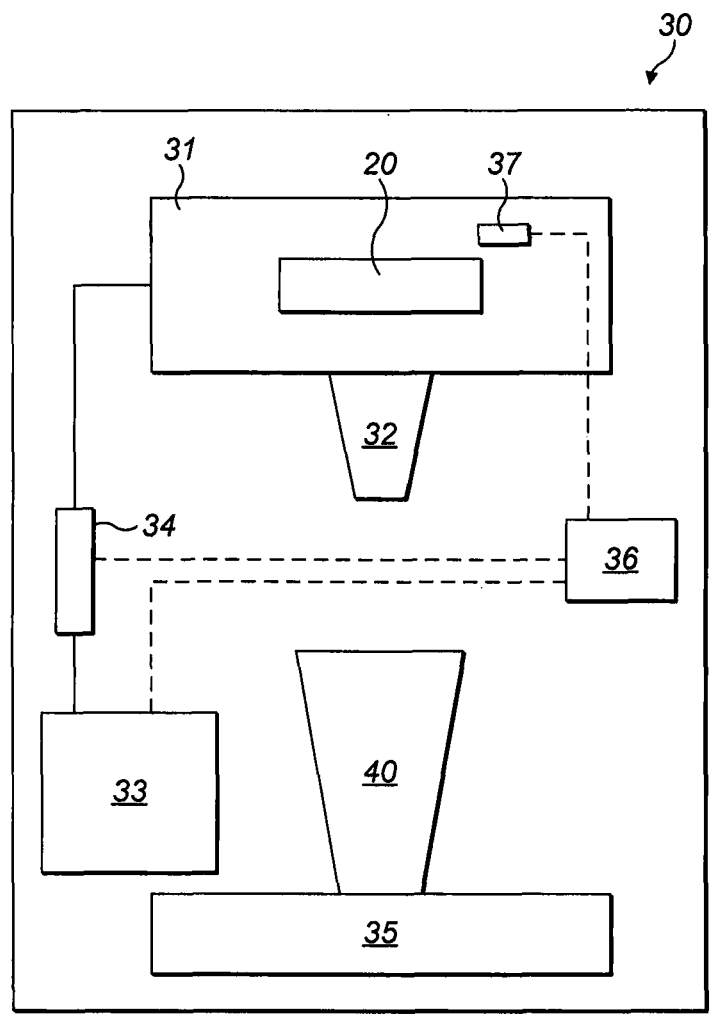
FIG. 3 is a schematic view of a beverage preparation machine according to the present disclosure.
Figure 4:
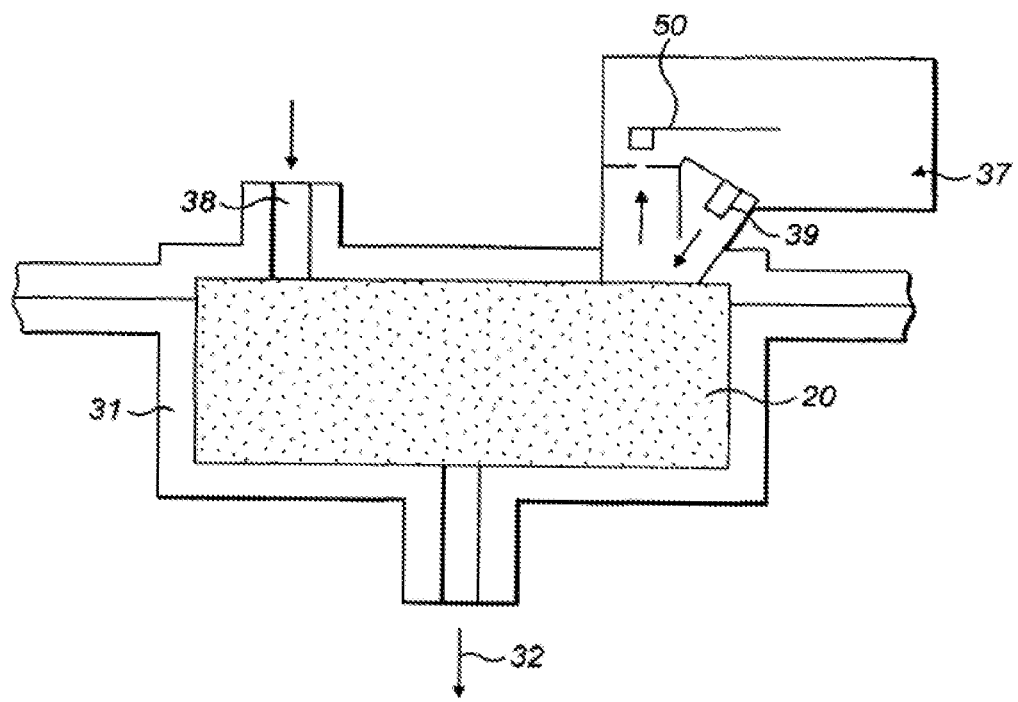
FIG. 4 is a schematic view of a part of one embodiment of beverage preparation machine according to the present disclosure.

The beverage preparation machine 30 is shown schematically in FIGS. 3 and 4 and comprises a brew chamber 31 which in use can receive a beverage ingredient tablet 20 therein. A source of water 33, which may be an internal reservoir of water or a connection to an external pressurised source of water such as a mains water supply, is connected to the brew chamber 31 via a flow heater 34. A pump (not shown) may be used to transport the water from the source 33 to the brew chamber 31. A cup stand 35 is provided on which a receptacle 40 may be placed to receive the dispensed beverage from an outlet 32 of the brew chamber 31. The brew chamber 31 also has associated with it a sensor 37 which is used to measure the surface finish of the beverage ingredient tablet 20. A controller 36 is operatively connected to the sensor 37, flow heater 34 and the source of water 33 and/or pump where present to control operation of the beverage preparation machine 30. The controller 36 includes a program memory for storing details of a plurality of dispense parameters and operating instructions for the various components of the beverage preparation machine 30.

The brew chamber 31, as shown schematically in FIG. 4, comprises a sealable chamber for receiving the beverage ingredient tablet 20 therein. A water inlet 38 is provided which is fluidly connected to the outlet of the flow heater 34. An outlet of the brew chamber is fluidly connected to the outlet 32 of the beverage preparation machine. The sensor 37 is mounted to, or formed as part of, the brew chamber 31. In the illustrated embodiment the sensor 37 comprises an emitter module 39 and a detector module 50. Depending on the type of sensor 37 used the emitter module 39 may be omitted.

The source of water 33, flow heater 34 and cup stand 35 may all be of conventional design, the details of which are well known to the person skilled in the art. They will therefore not be described in further detail.

Embodiments of beverage ingredient tablet 20 are shown in FIGS. 2a to 2d. The beverage ingredient tablet 20 of FIG. 2a comprises a simple tablet without any additional elements. The beverage ingredient tablet 20 is manufactured to comprise surface finishes for each type of intended beverage (for example, espresso, filter coffee, latte) which are distinguishable from each other by the sensor 37 of the beverage preparation machine 30. The variation in surface finish for the beverage ingredient tablets 20 may be one or more of a variation in colour, or a surface characteristic such as roughness and/or reflectance.

The variation in colour may be achieved by altering one or more of the characteristics of the beverage ingredients constituting the beverage ingredient tablet 20. For example, the degree of roasting of the roasted coffee precursor will alter the colour of the roasted ground coffee used to form a coffee-based tablet. In addition, or alternatively a colouring additive, such as food colouring, may be added to the beverage ingredient tablet 20 to provide a different surface colour for beverage ingredient tablets for different types of intended beverage.

The variation in roughness and/or reflectance may be achieved by altering the constituent ingredients of, the beverage ingredient tablet 21. For example, the particle size of the powdered ingredients may be selected to achieve a desired surface roughness and/or reflectance. In addition, or alternatively, the tablet may have surface features embossed during the compression forming of the tablet which may be different for beverage ingredient tablets for different types of intended beverage.

Figure 2A:
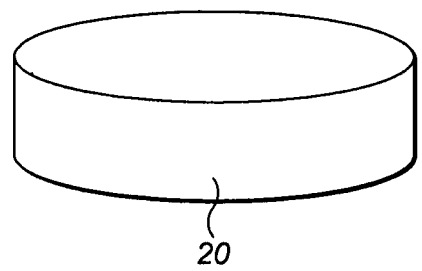
FIGS. 2a to 2d are schematic views of embodiments of tablet according to the present disclosure.
Figure 2B:
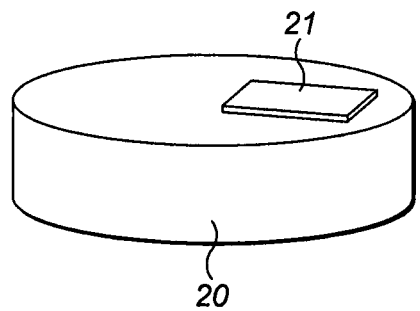

The beverage ingredient tablet 20 of FIG. 2*b* comprises a tablet with a label 21 affixed to the upper surface. The label 21 as shown covers a relatively small portion of the upper face of the beverage ingredient tablet 20. The label 21 may be formed from a food-safe material designed to dissolve in hot water such as edible rice paper or a sugar sheet.

The variation of the surface finish of the label 21 may be one or more of a variation in colour, or a surface characteristic such as roughness and/or reflectance.

The variation in colour of the label 21 may be achieved by altering the material of the label or by colouring the label 21 by printing or other suitable method.

The variation in roughness and/or reflectance of the label 21 may be achieved by altering the material of the label 21. In addition, or alternatively, the label 21 may have surface features created thereon by, for example, etching, raised printing, embossing, etc.

Figure 2C:
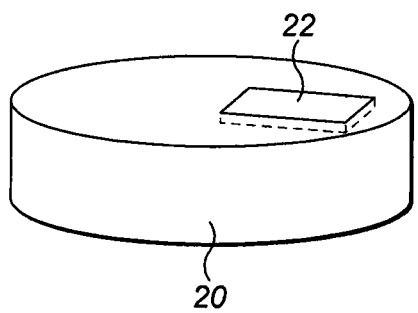

The beverage ingredient tablet 20 of FIG. 2*c* comprises a tablet with an insert 22 embedded in the upper surface such that an upper surface of the insert 22 is visible on the exterior surface of the tablet. The insert 22 as shown takes up a relatively small portion of the upper face of the beverage ingredient tablet 20. The insert 22 may be formed from may be formed from a food-safe material designed to dissolve in hot water.

In the same way as with the label 21 of FIG. 2*c* the variation of the surface finish of the insert 22 may be one or more of a variation in colour, or a surface characteristic such as roughness and/or reflectance. The variation may be achieved in the same way described above for the label 21.

Figure 2D:
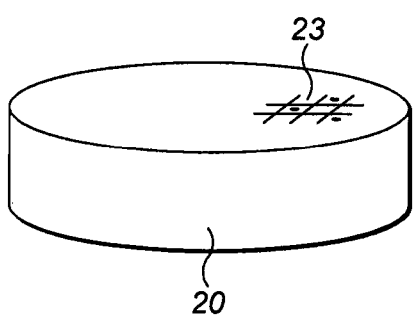

The beverage ingredient tablet 20 of FIG. 2*d* comprises a tablet with a pattern, picture or other visual element 23 located on the upper surface of the tablet. The pattern, picture or other visual element 23 may be printed onto the tablet using edible-ink or may be embossed into the upper surface during compression of the tablet during manufacture.

The variation in the surface finish of the pattern, picture or other visual element 23 may be a variation in one or more of the shape, size, configuration, roughness, reflectance and colour of the element.

The variation in colour of the pattern, picture or other visual element 23 may be achieved by altering the colour of ink used.

The variation in roughness and/or reflectance may be achieved, where ink is used, by altering the type or quantity of ink applied. Where embossing of the tablet is used the depth and pattern of embossing may be varied.

The variation in shape, size, or configuration may be achieved by choosing a number of different patterns to apply.

The sensor 37 used to identify the beverage ingredient tablets 20 may use a surface metrology technique including but not limited to one or more of interferometry, confocal microscopy, focus variation, structured light scanning, and electrical capacitance. Alternatively, or in addition, the sensor 37 may use one or more of colorimetry, and photogrammetry.

The sensor 37 of the beverage preparation machine 30, when it is desired to detect a variation in colour of the beverage ingredient tablets 20, may be a tristimulus colorimeter, a spectrophotometer, a spectrocolorimeter, or a spectralradiometer.

A tristimulus colorimeter is used to take a plurality of wideband spectral energy readings of the beverage ingredient tablet surface along the visible spectrum by using filtered photodetectors, such as silicon photodiodes. Advantageously, the reading is passive and does not require any emitted radiation from the sensor.

A spectrophotometer is used to measure the reflected colour of the beverage ingredient tablet surface. A spectrocolorimeter works similarly but outputs estimated tristimulus values.

A spectroradiometer is used to measure the spectral density of light reflected from the beverage ingredient tablet surface.

For each of the spectrophotometer, spectrocolorimeter and spectroradiometer the sensor 37 comprises an emitter module light source and a detector module.

The sensor 37 of the beverage preparation machine 30, when it is desired to detect a variation in roughness or reflectance of the beverage ingredient tablets 20, may be a interferometer, a confocal device, a focus variation device, a structured light scanning device, or a capacitive displacement sensor.

The interferometer may be a spectral interferometer or a confocal spectral interferometer.

The confocal device may be confocal laser scanning microscope device or a spinning-disk confocal microscope device. The confocal device may detect confocal chromatic aberration.

The photogrammater may be an electronic imaging device such as a CCD combined with image-recognition software.

The dispense parameters that may be configured include the volume of water dispensed, the temperature of the water, the pressure of the water, the flow rate of the water, and the presence or absence of a pre-wet stage.

EXAMPLE 1

A first type of roasted ground coffee tablet intended to form an espresso-style coffee is prepared having a relatively dark brown colour and a second type of roasted ground coffee tablet intended to form a long coffee is prepared having a relatively light brown colour.

The beverage preparation machine 30 comprises a tristimulus colorimeter. On insertion of the tablet and operation of the beverage preparation machine the colorimeter measures and transmits the tristimulus values of the surface of the tablet to the controller 36. Based on these values the controller 36 configures the dispense parameters as:

Espresso-Style Coffee Tablet
Water volume=60 ml
Water temperature=93 degrees Celsius
Flow rate=100% of nominal pump rate
Long Coffee Tablet
Water volume=190 ml
Water temperature=93 degrees Celsius
Flow rate=100% of nominal pump rate

EXAMPLE 2

A roasted ground coffee tablet intended to form a long coffee is prepared having a relatively rough surface roughness and a hot chocolate powder tablet intended to form a hot chocolate beverage is prepared having a relatively smooth surface roughness.

The beverage preparation machine 30 comprises a confocal spectral interferometer. On insertion of the tablet and operation of the beverage preparation machine the confocal spectral interferometer measures and transmits signals associated with the roughness of the surface of the tablet to the controller 36. Based on these values the controller 36 configures the dispense parameters as:

Long Coffee Tablet
Water volume=190 ml
Water temperature=93 degrees Celsius
Flow rate=100% of nominal pump rate
Hot Chocolate Tablet
Water volume=230 ml
Water temperature=83 degrees Celsius
Flow rate=100% of nominal pump rate

The invention claimed is:

1. A method of dispensing a beverage comprising:
    a) inserting a beverage ingredient tablet into a beverage preparation machine, wherein the beverage ingredient tablet comprises a compacted powder tablet containing one or more powdered beverage ingredients that form an exterior beverage ingredient surface of the beverage ingredient tablet;
    b) measuring a surface finish of at least a portion of the exterior beverage ingredient surface of the beverage ingredient tablet rather than any separate element to identify the beverage ingredient tablet;
    c) configuring one or more dispense parameters of the beverage preparation machine based on the identification of the beverage ingredient tablet; and
    d) operating the beverage preparation machine to dispense a beverage by contacting the beverage ingredient tablet with an aqueous fluid to dissolve the tablet.

2. The method of claim 1 wherein the one or more dispense parameters are selected from the group comprising: temperature of the aqueous fluid; volume of the aqueous fluid dispensed; flow rate of the aqueous fluid; pressure of the aqueous fluid; and presence or absence of a pre-wet stage.

3. The method of claim 1 wherein measuring the surface finish comprises measuring one or more of: the colour of the surface, the reflectance of the surface, the roughness of the surface, and a pattern on the surface.

4. The method of claim 3 wherein measurement of the surface finish is a non-contact measurement.

5. The method of claim 4 wherein the non-contact measurement comprises one or more of interferometry, confocal microscopy, focus variation, structured light scanning, electrical capacitance, colorimetry, and photogrammetry.

6. The method of claim 1, wherein the beverage ingredient tablet inserted into the beverage preparation machine has been unwrapped.

7. The method of claim 1, wherein the beverage ingredient tablet comprises a simple tablet without any additional elements.

8. The method of claim 1, further comprising the step of unwrapping the beverage ingredient tablet before the step of inserting the beverage ingredient tablet into the beverage preparation machine.

\* \* \* \* \*